United States Patent [19]

Jerde et al.

[11] 4,019,533
[45] Apr. 26, 1977

[54] DIGITAL VALVE ASSEMBLY

[75] Inventors: James B. Jerde, Mountain View; Victor B. van Blerk, San Jose, both of Calif.

[73] Assignee: Digital Dynamics, Inc., Sunnyvale, Calif.

[22] Filed: July 17, 1975

[21] Appl. No.: 596,581

[52] U.S. Cl. ............................................. 137/599
[51] Int. Cl.² ...................................... F16K 11/24
[58] Field of Search ................................. 137/599

[56] References Cited

UNITED STATES PATENTS

| | | | |
|---|---|---|---|
| 1,436,417 | 11/1922 | Trumble | 137/599 X |
| 2,907,346 | 10/1959 | Fortune | 137/599 X |
| 3,727,623 | 4/1973 | Robbins | 137/599 X |
| 3,746,041 | 7/1973 | Friedland | 137/599 |
| 3,937,248 | 2/1976 | Hutton | 137/599 X |
| 3,942,553 | 3/1976 | Gallatin | 137/599 |

FOREIGN PATENTS OR APPLICATIONS

| | | | |
|---|---|---|---|
| 361,653 | 10/1922 | Germany | 137/599 |

*Primary Examiner*—Robert G. Nilson
*Attorney, Agent, or Firm*—Lothrop & West

[57] ABSTRACT

A digital valve assembly has a body provided with a plurality of planar sides and has an inlet passage running axially thereinto and opening past an axial projection and through a plurality of inlet branch passages in divergent array to inlet valve openings on the respective sides of the body. There is also an outlet passage substantially coaxial with the inlet passage and open at the other end of the body. In communication with the outlet passage over an axial projection therein is a plurality of outlet branch passages, each opening on a respective one of the body sides and converging therefrom toward the outlet passage. The outlet valve openings and inlet valve openings are close together or are paired, so that each pair is coverable by a respective one of a number of valves, each mounted on the body on one of the sides in a position to control flow through the openings therein. The outlet branch passages are preferably of different cross-sectional flow areas, the flow area of one passage being related to the respective flow areas of the other passage in accordance with a predetermined scheme or size relationship, conveniently one in which the quantity of flow through the valve as a whole can be controlled in even steps or as desired by varying the particular valve or valves which may be open at any one time.

3 Claims, 7 Drawing Figures

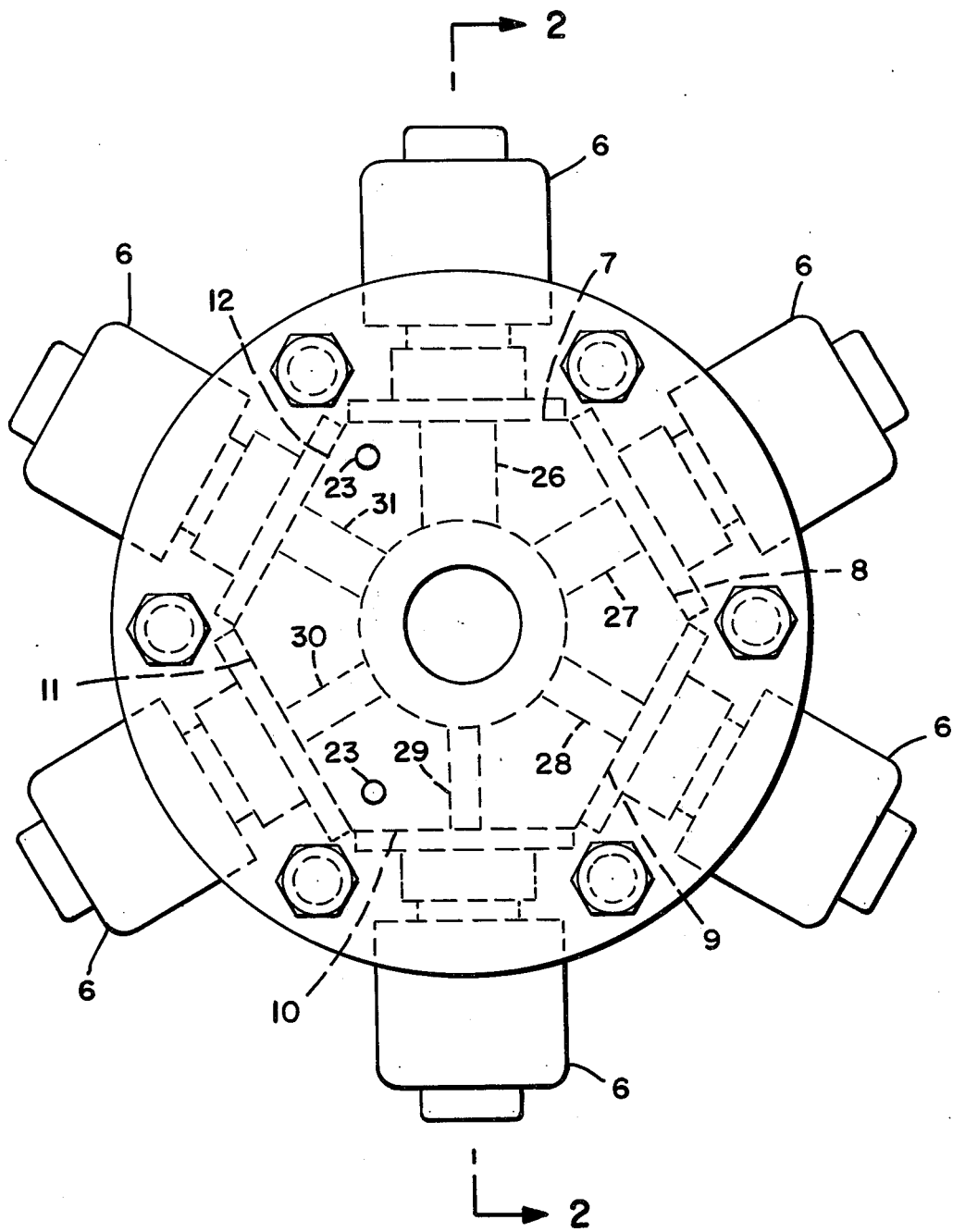
FIG_1

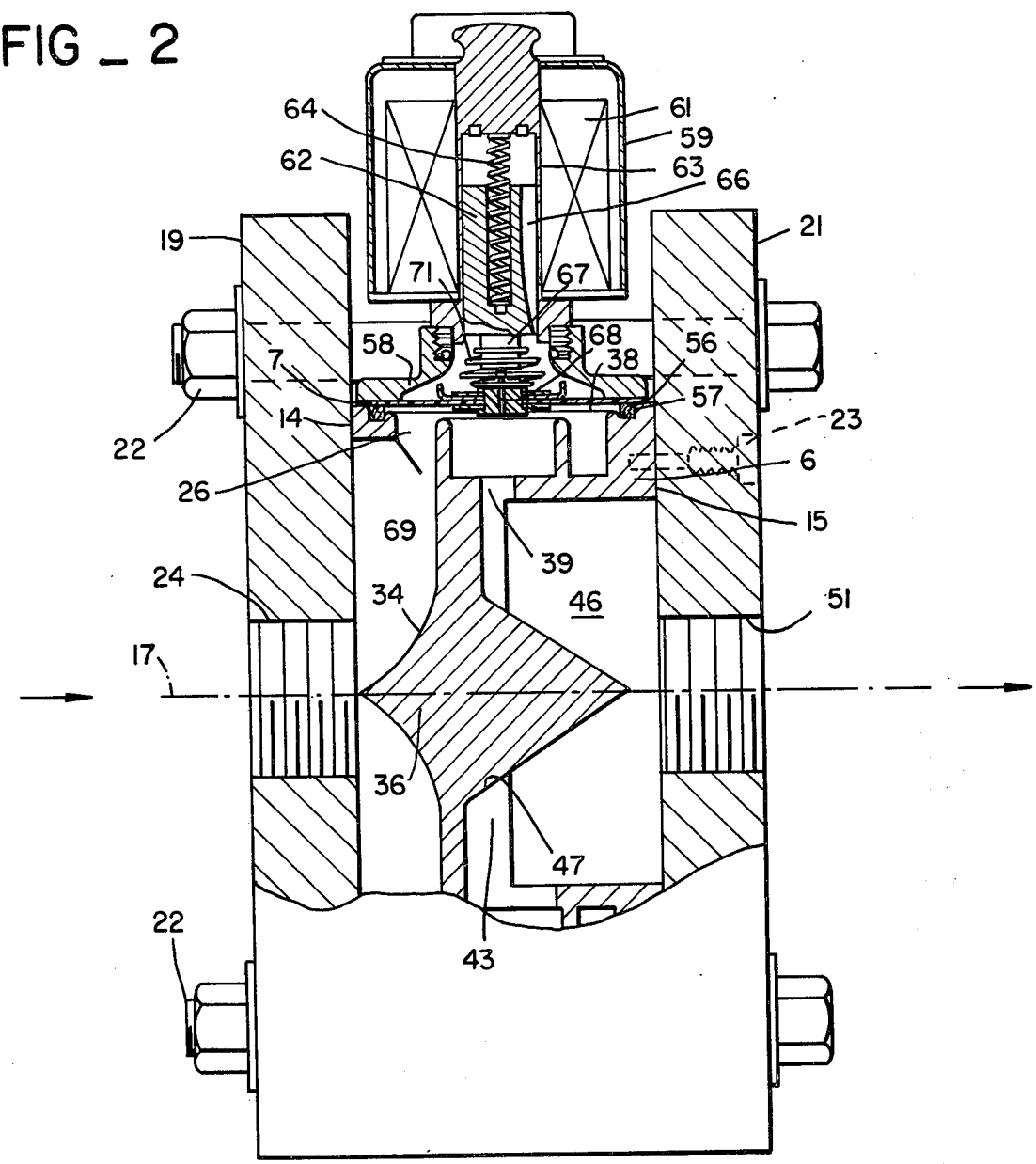
FIG_2
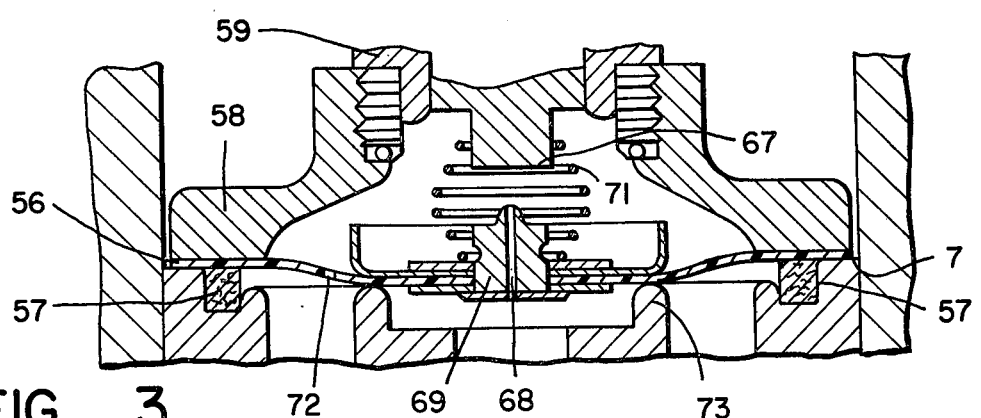
FIG_3

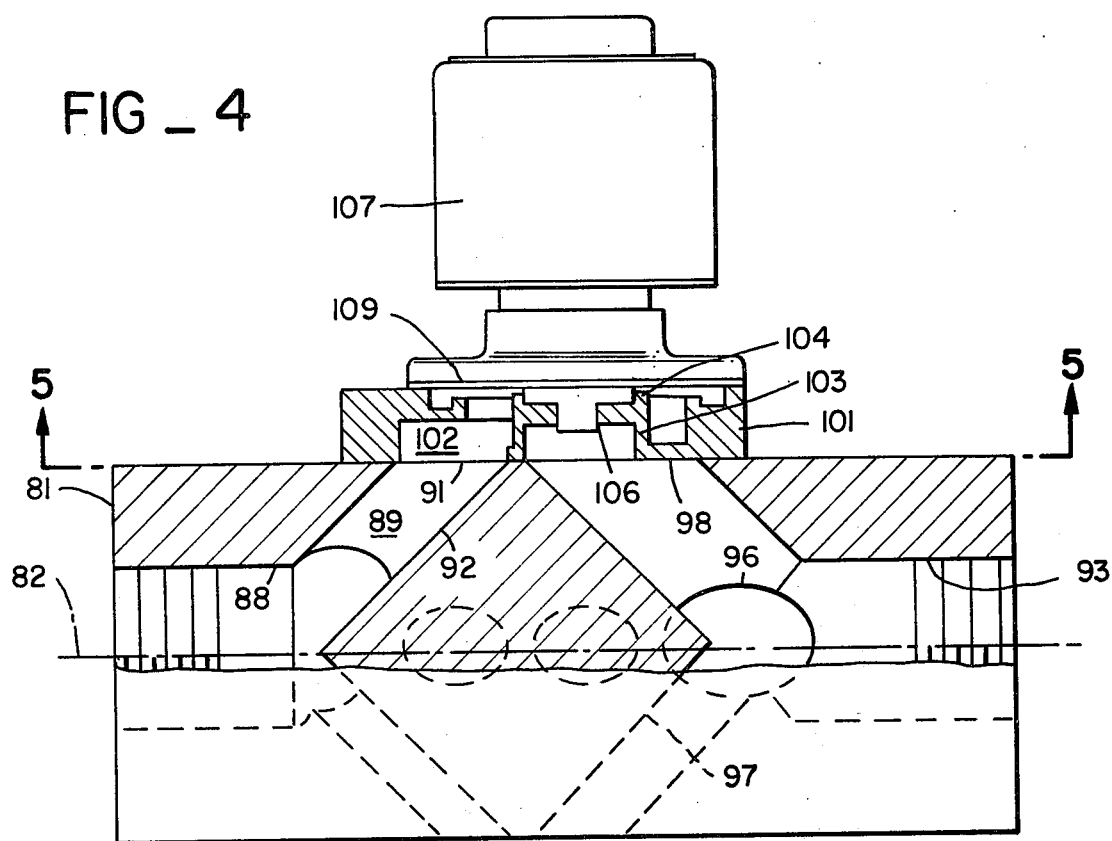
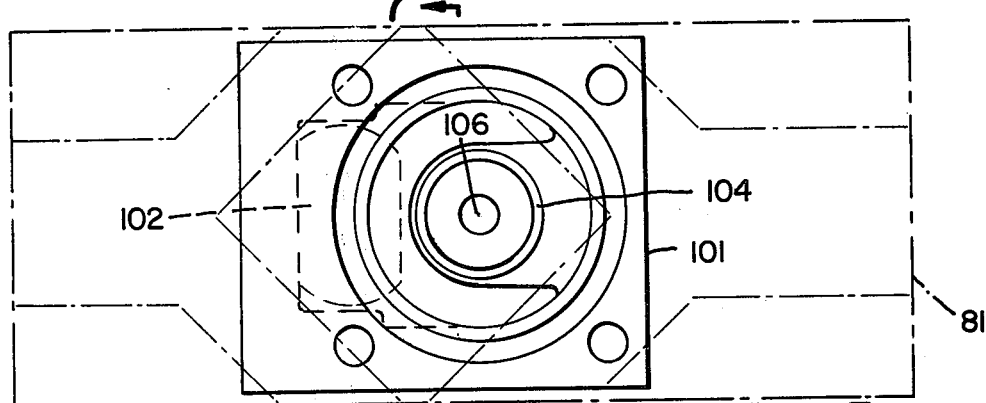
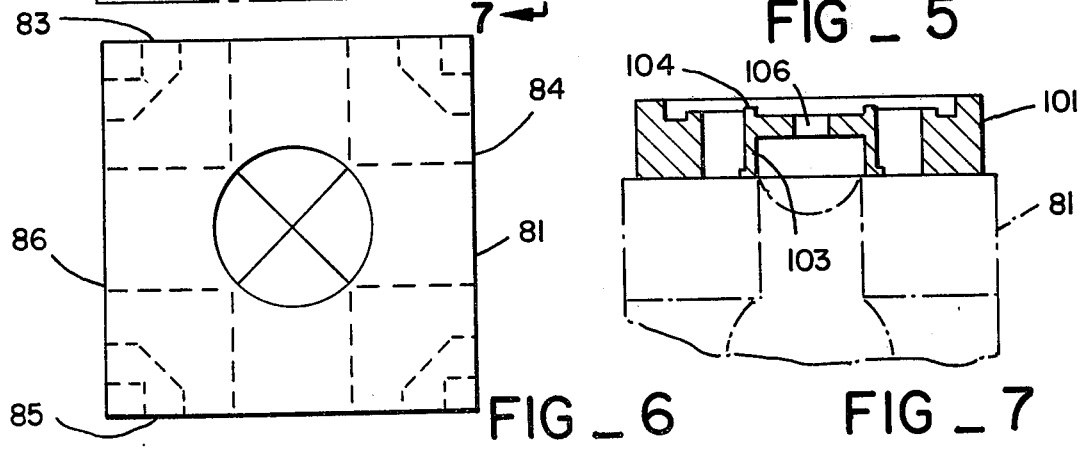

DIGITAL VALVE ASSEMBLY

In the copending patent application of one of us, Jerde, Ser. No. 460,350 filed April 12, 1974 and entitled "Flow Control System", there is shown an arrangement in which digital valves are utilized for the control of gas flow.

It is an object of the present invention to provide a digital valve assembly which is a simple, compact body provides for the mounting and operation of a number of digital valves.

Another object of the invention is to provide a digital valve assembly in which the various parts are so related that the opening and closing of the valves from time to time is different combinations does not produce unusual or deleterious flow patterns.

Another object of the invention is to provide a digital valve assembly that can readily be adapted in production to the accommodation of varying numbers of control valves.

Another object of the invention is to provide a digital valve assembly that is compact and economical not only of materials but also of frictional flow areas.

Another object of the invention is to provide a digital valve assembly that is an improvement over such valve assemblies heretofore known.

Other objects, together with the foregoing, are attained in the embodiments of the invention described in the accompanying description and illustrated in the accompanying drawings, in which:

FIG. 1 is an end elevation of one form of digital valve assembly pursuant to the invention;

FIG. 2 is for the most part a cross-section, the plane of which is indicated by the line 2—2 of FIG. 1, certain portions not being broken away but being illustrated in side elevation and some parts being omitted for clarity of disclosure;

FIG. 3 is an enlarged cross-section on an axial plane through one of the controlling valves as illustrated at the top of FIG. 2;

FIG. 4 is a cross-section for the most part on a vertical axial plane through a modified form of valve assembly of the general type shown in FIGS. 1, 2 and 3, certain portions being in side elevation and some parts being omitted;

FIG. 5 is a section on the line 5—5 of FIG. 4 showing a mounting plate in plan from below;

FIG. 6 is an end view of the device shown in FIG. 4; and

FIG. 7 is a cross-section, the plane of which is indicated by the line 7—7 of FIG. 5, portions being broken away to reduce the size of the figure.

While the digital valve assembly pursuant to the invention can be embodied in a large number of different ways, it is disclosed herein in four and six unit form, although two, eight and other numbers of units are equally feasible.

In FIGS. 1–3 the arrangement accommodates as many as six different paths of flow within the valve, each of such paths preferably being of a different flow area than the flow area of any of the others, and the relationship of the flow areas being in accordance with a predetermined pattern, as will appear.

As particularly shown in FIGS. 1 and 2, there is provided a central body 6 conveniently of metal or plastic having a hexagonal cross-section to afford a number of planar sides 7, 8, 9, 10, 11 and 12. The body also has generally parallel planar end faces 14 and 15 normal to an axis 17. The body can readily be clamped without leakage between a pair of flange plates 19 and 21 and secured in position by through bolts 22. One or more positioning screw pins 23 can be used to align the body with respect to the flanges both initially and during replacement after removal. The end plate 19 is preferably the upstream or inlet plate and is provided with a threaded inlet opening 24 adapted to receive a threaded inlet pipe, not shown, or to be welded to an appropriate inlet pipe extending generally along the axis 17. Within the body 6 a single inlet passage which extends along a portion of the axis 17 (this portion being referred to as the inlet axis) diverges into six branch passages 26, 27, 28, 29, 30 and 31 respectively. Each of these passages may be of a standard flow area, but each is preferably of a different diameter or of a different flow area, with the relationship of the flow areas substantially as set forth in my patent application indicated above.

The intercommunication between the inlet passage and the inlet branch passages is arranged in a particular way. Within the body the various passages merge smoothly and with a curved bounding wall 34 which in effect identifies a surface of revolution about the inlet axis 17 and constituting in effect a projection 36 extending upstream and diminishing gradually in cross-sectional area in planes normal to the inlet axis 17 as such planes are taken farther and farther upstream. Although not exactly correct, the curved wall is often referred to as a "cone" or "turning cone" and is carefully centered on the axis 17 as located by the pins 23. The reason for the projection 36 is to assist the incoming fluid in travelling smoothly and without excessive eddying or turbulence from the inlet passage 24 into any one or more of the momentarily active, various inlet branch passages.

Each of the branch passages, such as 26, for example, opens from the body onto a respective one, such as 7, of the adjacent planar faces conveniently to one side of center thereof and joins a portion of a generally circular recess 38 in the body.

Somewhat similarly, from the recess 38 an outlet branch passage 39 leads from the face 7 of the body. This is one of a plurality of such passages extending at first radially and then opening into an outlet passage 46. The outlet branch passage 39 is one of a number of such passages varying in cross-sectional area in the ratio disclosed in the above-mentioned patent application. While both the inlet branch passages and the outlet branch passages may have a special cross-sectional area relationship one to the other, any one set of the passages, say the inlet set, may be all of the same diameter or, if desired, all of the outlet branch passages may be of the same diameter, but at least one such set has the varying diameter or flow area consistent with use as a digital valve.

All of the passages 39, 41, 42, 43, 44 and 45 merge with the outlet passage 46 in such a way as to define a projection 47 symmetrical with the axis 17 on the downstream side, this portion being referred to as the downstream axis. The projection 47 is of a diminishing area in cross-section in planes normal to the axis 17 as the projection extends downstream. This downstream "turning cone" provides a relatively smooth merger, without excessive turbulence and eddying, of fluid entering into the downstream passage 46 from any one or more of the branch passages that are momentarily in use. It also assists in recovering pressure energy from velocity energy in the fluid. Flow from the outlet passage 46 is through an outlet opening 51 in he flange 21. This can be open to the atmosphere but is usually provided with threads for engagement with an outlet pipe (not shown) or can be welded to such an outlet pipe.

The structure as so far described affords a single incoming stream an opportunity to divide into any one or more of six separate paths and then to converge and merge into a single outgoing flow.

Each of the recesses 38 on each of the body faces is provided with an appropriate controlling valve. Since all of these valves are identical, a description of one applies equally to the others. Seated on one of the faces such as 7 (see FIG. 2) is a valve diaphragm 56 resting against a sealing packing 57 and appropriately held in place by a hood 58 having a planar end and appropriately secured to the body and itself carrying an actuator 59. The actuator is of a relatively standard character and has a housed solenoid 61. Controlled by the solenoid is a core 62 operating in a sleeve 63 against a return spring 64. There is a by passage 66 through the core 62. When energized, the core is lifted against the spring 64 with incidental passage of fluid from one end to the other of the core. When de-energized, the core falls to the position shown in FIG. 3 under the urgency of the spring 64. At its lower end the core has a pilot valve seat 67 adapted to cooperate with a through passage 68 in a pilot valve spool 69 supported on the diaphragm 56. The passage 68 is in alignment with the branch opening 39. A light spring 71 urges the pilot valve spool 69 away from the core 62.

When the solenoid 61 is not energized and the spring 64 is effective, the valve seat 67 is moved against the force of the spring 71 to seat on the pilot valve spool 69. This block any fluid flow from the interior of the hood 58. The interior of the hood tends to fill with fluid from the inlet passage through a bleed orifice 72 in the diaphragm 56. The upstream pressure then is effective over the entire surface of the diaphragm and forces the diaphragm downwardly onto an annular seat 73 surrounding the outlet branch passage 39. This precludes flow from the corresponding inlet branch 26 to the related outlet branch 39.

When the solenoid coil 61 is energized it is effective to overcome the force of the spring 64 and to lift the core 62 and thus to lift the seat 67 from the pilot valve spool 69. This action opens the passage 68 for flow from the interior chamber of the hood 58 into and through the passage 68 and to the downstream outlet branch 39 and thus finally to the outlet 51. The passage 68 is much bigger than the orifice 72, so that there is then virtually no pressure above the diaphragm. The inlet pressure beneath is effective to lift the diaphragm 56 and its attachments away from the seat 73 and to permit full volume flow from the related inlet branch passage 26 to the relate outlet branch passage 39. When the solenoid 61 is again de-energized, the pilot outflow passage 68 is again blocked and the valve diaphragm 56 goes to closed position.

By energizing the individual solenoids in any desired sequence and pattern, it is possible to operate the valve as a digital valve to control the inlet and outlet flow in a smooth, step fashion and without any substantial detrimental flow effect due to the particular one or ones of the valves which might momentarily be open. That is, the interrelationship or interreaction between the various passages is minor, partly due to the arrangement of the passages and particularly due to the projections 36 and 47.

The six-valve arrangement of FIGS. 1, 2 and 3 is sometimes more elaborate than is required. In certain instances, particularly with smaller flows, four-valve arrangement is utilized. This is as shown in FIGS. 4–7 inclusive. In this instance there is a block 81 symmetrical about an axis 82 and preferably having four sides to establish planar faces 83, 84, 85 and 86. Since the faces and their appurtenances are all substantially the same, except for the block passage size, a description of one applies equally to the others.

From one end of the block and extending along the axis 82, there is an inlet passage 88 for threaded or other connection to a supply line, not shown. Extending to adjacent ones of the side faces are branch inlet passages such as 89. These can be of different cross-sectional areas, as described. Each branch passage opens on its own side face of the block through an opening 91. The passages 89 are preferably formed, usually drilled, at an angle to the axis 82 so as to leave intervening them a projection 92 of a generally diminishing cross-sectional area in planes normal to the axis 82 as the projection extends upstream.

In a comparable fashion, the block also has along the axis 82, now referred to as an outlet axis, an outlet passage 93 provided for connection to an outlet pipe, not shown, and having four outlet branch passages such as 96 merging therewith. In effect there is defined a downstream converging projection 97 having a diminishing cross-sectional area normal to the axis 82 as the projection extends downstream. Each of the branch passages 96 opens through one of the faces such as the face 83 in the general vicinity of the opening 91, the openings being virtually paired and being generally elliptical in plan.

Suitably fastened to the block and overlying the paired openings 91 and 98 is a transition plate 101 having a chamber 102 generally surrounding a central boss 103 defining a seat 104 and having an opening 106 therethrough communicating with a respective one of the outlet branch passages 96. Seated on and sealed to the plate 101 is a valve actuator 107 of the general style illustrated in FIGS. 2 and 3 and operating in the same fashion by electrical means. The actuator is effective to operate a diaphragm 109 controlling flow between the chamber 102 and the chamber 106. When the diaphragm is open there is free flow from the branch inlet passage 89 to the branch outlet passage 96, but when the diaphragm is closed such flow is precluded.

As in the first instance, the diaphragm is either maintained in its fully closed position or, alternatively, in its fully open position, it being in an intermediate location only transitorily between the two extremes. In this way, any one of the four actuators can be actuated by itself or with one or more of its companions to control flow from the inlet to the outlet through one or more of the four different paths provided. The projections both upstream and downstream direct the fluid flow for good handling without deleterious eddies or turbulence no matter what particular combination of passages is momentarily in use. The net result is a highly compact and efficient digital valve mechanism.

What is claimed is:

1. A digital valve assembly comprising a polygonal body exteriorly bounded by a plurality of joining planar sides and also bounded by a pair of parallel planar end faces, means forming an inlet passage opening on one of said end faces of said body and in communication with means forming a plurality of discrete inlet branch passages each having a discrete and separate inlet valve opening entirely on a respective one of sid planar sides, means forming an outlet passage opening on the other of said end faces of said body and in communication with means forming a plurality of discrete outlet branch passages each having a discrete and separate outlet valve opening entirely on a respective one of said planar sides adjacent to and concentric with a respective one of said inlet valve openings, the flow areas of said outlet branch passages having a predetermined and different size relationship to each other, and a plurality of valves each having a planar end substantially abutting and mounted on said body at and entirely outside of a respective one of said planar sides and overlying and interconnecting related ones of said inlet valve openings and concentric outlet valve openings and in position to control flow between said related ones of said inlet and outlet valve openings.

2. An assembly as in claim 1 in which said inlet passage has an axis and said inlet branch passages intersect said inlet passage and have walls continuing toward said axis to define a projection extending along said axis and tapering substantially to an upstream point with a cross-sectional area normal to said axis diminishing upstream of said inlet passage.

3. An assembly as in claim 1 in which said outlet passage has an axis and said outlet branch passages intersect said outlet passage and have walls continuing toward said axis to define a projection extending along said axis and tapering substantially to a point with a cross-sectional area normal to said axis diminishing downstream of said outlet passage.

* * * * *